(12) United States Patent
Rühle et al.

(10) Patent No.: US 9,126,576 B2
(45) Date of Patent: Sep. 8, 2015

(54) CLUTCH ARRANGEMENT AND DRIVETRAIN FOR A MOTOR VEHICLE

(71) Applicant: GETRAG Getriebe- und Zahnradfabrik Hermann Hagenmeyer GmbH & Cie KG, Untergruppenbach (DE)

(72) Inventors: Günter Rühle, Löchgau (DE); Mark Schweiher, Lauffen (DE)

(73) Assignee: GETRAG Getriebe—und Zahnradfabrik Harmann Hagenmeyer GmbH & Cie KG, Untergruppenbach (DE)

( * ) Notice: Subject to any disclaimer, the term of this patent is extended or adjusted under 35 U.S.C. 154(b) by 34 days.

(21) Appl. No.: 14/085,155

(22) Filed: Nov. 20, 2013

(65) Prior Publication Data

US 2014/0080666 A1    Mar. 20, 2014

Related U.S. Application Data

(63) Continuation of application No. PCT/EP2012/057507, filed on Apr. 25, 2012.

(30) Foreign Application Priority Data

May 23, 2011    (DE) .......................... 10 2011 102 277

(51) Int. Cl.
*B60W 10/02* (2006.01)
*B60W 10/11* (2012.01)
(Continued)

(52) U.S. Cl.
CPC ............... *B60W 10/02* (2013.01); *B60W 10/11* (2013.01); *F16D 25/123* (2013.01);
(Continued)

(58) Field of Classification Search
CPC ....... B60W 10/02; B60W 10/11; F16D 25/06; F16D 25/062; F16D 25/063; F16D 25/0635; F16D 25/0638; F16D 25/10; F16D 25/12; F16D 25/123; F16D 25/14; F16D 48/02; F16D 2048/0206; F16D 2048/0221; F16D 2048/0224; F16D 2048/0227; F16D 2048/0233; F16D 2048/0245; F16D 2048/0248; F16D 2048/026; F16D 2048/0287; F16D 2048/029; F16D 2048/0296
See application file for complete search history.

(56) References Cited

U.S. PATENT DOCUMENTS 4,923,025 A  *  5/1990  Ellers .......................... 180/65.23
7,174,978 B2     2/2007  Taniguchi et al.
(Continued)

FOREIGN PATENT DOCUMENTS

DE           10314182 A1    11/2003
DE        102009005410 A1    7/2010
(Continued)

OTHER PUBLICATIONS

International Preliminary Report on Patentability dated Dec. 3, 2013, 14 pages.
(Continued)

*Primary Examiner* — Jacob S Scott
(74) *Attorney, Agent, or Firm* — Reising Ethington P.C.

(57) ABSTRACT

A clutch arrangement for a drivetrain of a motor vehicle. The clutch arrangement has a first clutch, a second clutch, and a hydraulic actuator arrangement. The actuator arrangement has a first hydraulic cylinder for actuating the first clutch and a second hydraulic cylinder for actuating the second clutch. The actuator arrangement has an actuator pump which is driven by means of an electric motor and which can be operated in two directions of rotation. The actuator pump has a first port, which is connected to the first hydraulic cylinder, and a second port, which is connected to the second hydraulic cylinder. The actuator arrangement actuates the first or the second clutch depending on the direction of rotation of the actuator pump.

16 Claims, 2 Drawing Sheets

(51) Int. Cl.
  *F16D 25/12* (2006.01)
  *F16D 48/02* (2006.01)

(52) U.S. Cl.
  CPC ..... *F16D 48/0206* (2013.01); *F16D 2048/026* (2013.01); *F16D 2048/029* (2013.01); *F16D 2048/0248* (2013.01); *Y10T 477/641* (2015.01)

(56) References Cited

U.S. PATENT DOCUMENTS

| | | | |
|---|---|---|---|
| 7,395,908 | B2 | 7/2008 | Hegerath et al. |
| 7,401,689 | B2 | 7/2008 | Hegerath et al. |
| 7,832,540 | B2 | 11/2010 | Quehenberger et al. |
| 8,938,958 | B2 * | 1/2015 | Nett et al. ............... 192/48.601 |
| 2003/0230461 | A1 | 12/2003 | Sakata et al. |
| 2009/0038908 | A1 | 2/2009 | Quehenberger et al. |
| 2011/0284337 | A1 | 11/2011 | Gassmann et al. |
| 2014/0080650 | A1 * | 3/2014 | Ruhle et al. ...................... 475/5 |

FOREIGN PATENT DOCUMENTS

| | | |
|---|---|---|
| EP | 1236918 A1 | 9/2002 |
| EP | 1439086 A2 | 7/2004 |
| EP | 1637756 A1 | 3/2006 |
| WO | WO2005064187 A1 | 7/2005 |
| WO | WO2006002450 A1 | 1/2006 |
| WO | WO2006007086 A1 | 1/2006 |
| WO | WO2006128637 A1 | 12/2006 |

OTHER PUBLICATIONS

Written Opinion & International Search Report for PCT/EP2012/057507 dated Jan. 14, 2013, 17 pages.

* cited by examiner

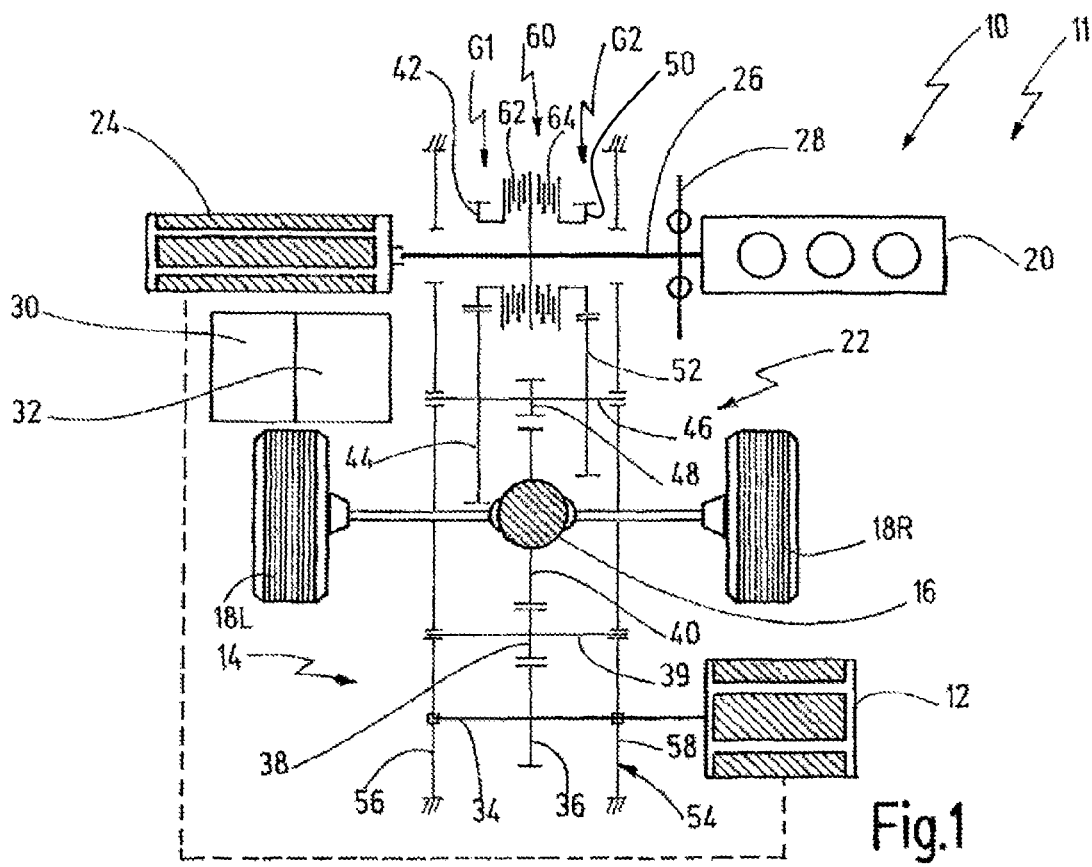
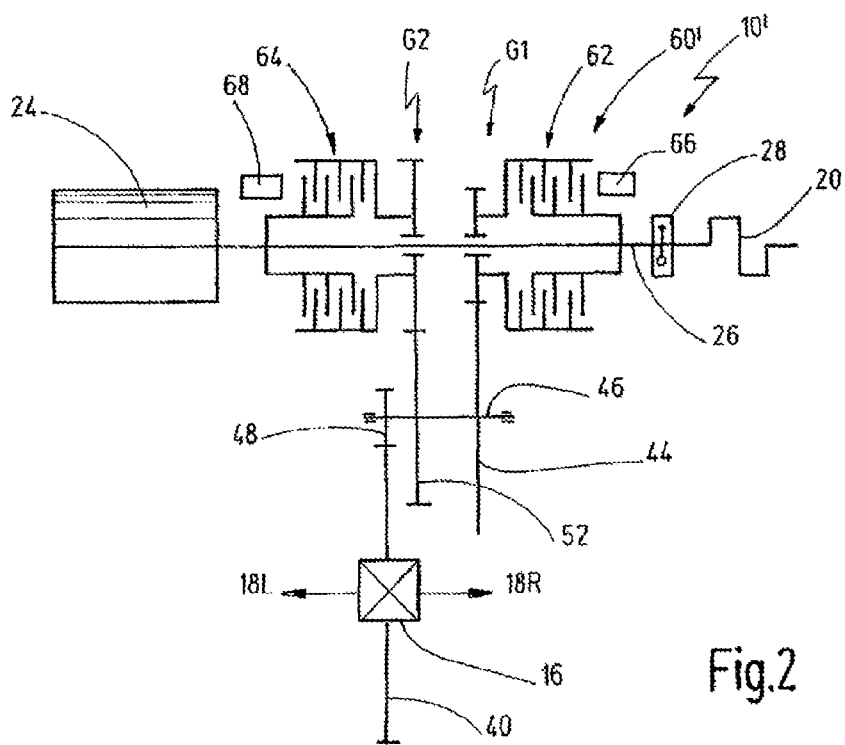

CLUTCH ARRANGEMENT AND DRIVETRAIN FOR A MOTOR VEHICLE

CROSS-REFERENCE TO RELATED APPLICATIONS

This application is a continuation of international patent application PCT/EP2012/057507, filed on Apr. 25, 2012, which claims priority from German patent application DE 10 2011 102 277.9, filed on May 23, 2011, the whole content of these applications is hereby included by reference.

BACKGROUND

The present invention relates to a clutch arrangement for a drivetrain of a motor vehicle, having a first clutch, a second clutch and a hydraulic actuator arrangement, wherein the actuator arrangement has a first hydraulic cylinder for actuating the first clutch and a second hydraulic cylinder for actuating the second clutch, and wherein the actuator arrangement has an actuator pump which is driven by means of an electric motor and which can be operated in two directions of rotation.

The present invention also relates to a drivetrain for a motor vehicle, having a first electric machine for providing drive power, wherein the first electric machine is connected to an electrical energy store, having a differential which can distribute drive power to two driven wheels of the motor vehicle, having a first transmission arrangement which connects the first electric machine to the differential, having an internal combustion engine, having a second electric machine which is coupled to the internal combustion engine in order to charge the electrical energy store in a generator mode, and having a second transmission arrangement which connects the internal combustion engine to the differential, wherein the second transmission arrangement has a first gear stage and a second gear stage which can be alternately engaged, for the transmission of drive power from the internal combustion engine to the differential, by means of a clutch arrangement.

A clutch arrangement is known for example from document EP 1 236 918 B1.

Said document proposes a clutch arrangement for a dual-clutch transmission, wherein the two clutches are in the form of wet-running multiplate clutches and can be actuated in each case by means of a hydraulic slave cylinder. Each of the slave cylinders is directly connected to a respective fluid pump. The pressure in the slave cylinder is regulated by means of the volume flow rate of the respective pump.

A drivetrain of the type described above can be used in particular as a so-called range extender drive. Here, the vehicle is driven by means of the first electric machine. The internal combustion engine can drive the second electric machine in the generator mode in order to charge the electrical energy store. In particular at relatively high speeds, however, it is also possible, by means of the second transmission arrangement, for the internal combustion engine to be used as a drive for the motor vehicle.

Here, the second transmission arrangement has two gear stages which can be alternately engaged for the transmission of drive power.

SUMMARY

It is the object of the invention to specify an improved clutch arrangement and an improved drivetrain.

Said object is achieved by means of a clutch arrangement for a drivetrain of a motor vehicle, having a first clutch; a second clutch; a hydraulic actuator arrangement; wherein the actuator arrangement has a first hydraulic cylinder for actuating the first clutch and a second hydraulic cylinder for actuating the second clutch, wherein the actuator arrangement has an actuator pump which is driven by means of an electric motor and which can be operated in two directions of rotation, wherein the actuator pump has a first port, which is connected to the first hydraulic cylinder, and a second port, which is connected to the second hydraulic cylinder, wherein the actuator arrangement actuates the first or the second clutch depending on the direction of rotation of the actuator pump.

The above object is also achieved by means of a drivetrain of the type mentioned in the introduction, wherein a clutch arrangement according to the invention is used for the engagement and disengagement of the two gear stages of the second transmission arrangement.

The clutch arrangement according to the invention is suitable for any drivetrains that have two clutches provided for being alternately actuated. Since only a single actuator pump is required for the actuation of the two clutches, the clutch arrangement can be constructed in an expedient manner in terms of costs and installation space.

The first and the second clutch may be wet-running clutches such as multiplate clutches. Said clutches may however also be friction clutches of dry type of construction. Furthermore, the clutches may be shifting clutches such as are used, for example in the form of synchronization units, in countershaft-type transmissions.

The invention is particularly preferably used in a range extender drivetrain which has two gear stages. In the case of a range extender drivetrain of said type, the two gear stages serve for transmitting drive power of the internal combustion engine. In a drivetrain of said type, said operating mode is used within intended parameters only at relatively high speeds. Accordingly, there is generally no demand, even for reasons of comfort, for gear changes to be performed without an interruption in traction force.

The object is thereby achieved in its entirety.

In the case of the clutch arrangement according to the invention, it is particularly advantageous if the first port is connected via a first connecting line directly to the first hydraulic cylinder and/or if the second port is connected via a second connecting line directly to the second hydraulic cylinder.

In the case of the direct connection of the actuator pump to a respective hydraulic cylinder, expensive pressure regulating valves are not required. The clutch is actuated by virtue of the pressure in the hydraulic cylinder being adjustable. In the case of the direct connection of the hydraulic cylinder to the actuator pump, said pressure is adjusted by means of the volume flow rate delivered by the actuator pump.

Furthermore, it is advantageous here if the first connecting line is connected via a first aperture to a tank and/or if the second connecting line is connected via a second aperture to a tank.

In the present case, a tank is to be understood to mean any type of reservoir for hydraulic fluid. Furthermore, the expression "tank" is to be considered to be functionally equivalent to a location within the hydraulic system at which the hydraulic fluid is not under pressure. Through the provision of such an aperture, the actuator pump constantly delivers a certain volume flow rate, with the effect that the regulability/controllability of the pump and of the pressure can be improved.

Overall, it is advantageous if the first port is connected via a first check valve to a tank and/or if the second port is connected via a second check valve to a tank.

In this way, it can be ensured that the respective port of the actuator pump is not connected to the tank if, depending on the direction of rotation, it is operating as a pressure port. Furthermore, it can be ensured that the respective port, when acting as a suction port, can deliver hydraulic fluid out of the tank via the check valve.

Here, the first and the second check valves are preferably in the form of snifting valves.

In a further preferred embodiment, the first clutch and the second clutch are in the form of wet-running clutches, wherein the actuator arrangement is designed to supply lubricating fluid to the clutches.

In said embodiment, the actuator arrangement serves not only for the actuation of the first and of the second clutch but is also configured for supplying lubricating and/or cooling fluid to the first and the second clutch. The volume flow for the lubrication and/or cooling of the clutches is in this case preferably branched off from the volume flow provided in each case by the actuator pump. Accordingly, in said embodiment, a separate lubricating fluid pump can be omitted.

Here, it is particularly preferable if the first port and/or the second port is connected to a lubricating fluid line via which lubricating fluid is supplied to the clutches.

The lubricating fluid line may be a single line which then branches to the two clutches. It is alternatively also possible for the first port to be connected to a first lubricating fluid line and for the second port to be connected to a second lubricating fluid line, which lubricating fluid lines supply lubricating fluid to the clutches separately in each case.

Here, it is also advantageous if the first port is connected via a third check valve to the lubricating fluid line and/or if the second port is connected via a fourth check valve to the lubricating fluid line.

If, depending on the direction of rotation, a port is operating as a pressure port, the check valve connected to said port opens in order to branch off lubricating fluid. By contrast, if the port is in the form of a suction port owing to the direction of rotation, the third or fourth check valve connected to said port is closed.

By means of the check valves, it is ensured that the hydraulic system is ventilated during the filling process, and also that no air is pumped into the hydraulic system by the actuator pump.

In a further preferred embodiment, a first aperture is arranged in the connection between the first port and the lubricating fluid line and/or a second aperture is arranged in the connection between the second port and the lubricating fluid line.

It is alternatively also possible for only a single aperture to be provided in the lubricating fluid line.

As mentioned above, an aperture of said type can improve the regulability/controllability of the actuator pump and of the clutch arrangement. In general, an aperture of said type may in this case be provided in a connecting line to the respective hydraulic cylinder.

In the present case, it is proposed that the aperture be integrated into the lubricating fluid circuit. In this way, said aperture firstly serves the purpose of improving the regulability/controllability of the actuator pump or of the pressure of the hydraulic cylinder respectively to be filled. Secondly, the lubricating fluid flow is limited in this way, such that the actuator pump can be dimensioned so as to be relatively small.

In the case of the drivetrain according to the invention, it is particularly advantageous if the second transmission arrangement has only the first gear stage and the second gear stage.

In the case of the drivetrain according to the invention, the internal combustion engine is preferably used only in a restricted speed range of the motor vehicle. The use of only two gear stages in the second transmission arrangement is thus generally adequate.

Accordingly, the second transmission arrangement of the drivetrain can be realized at low cost and with a low weight.

In one advantageous embodiment, the clutch arrangement has a first clutch and a second clutch, at least one of which is in the form of a powershift clutch.

In said embodiment, the at least one powershift clutch can be used not only for engaging the associated gear stage. In fact, by contrast to a synchronizing clutch, the powershift clutch can also be used for starting, for example. In the latter case, it is for example possible for the vehicle to be operated purely under internal combustion engine power in the event of failure of the electric machine, even though in this case it may be necessary for a high rotational speed difference to be overcome in the powershift clutch during a starting process.

A further advantage of said embodiment is that there is no need for a starting and/or separating clutch which is separate from the gear stage clutches.

In the present case, the expression "powershift clutch" refers generally to a friction clutch that can transmit drive power even in a slipping state. The expression "powershift clutch" is not intended to signify that shifts between the gear stages can take place under load. However, if a powershift clutch is used for each of the two gear stages, gear stage changes are generally also possible under load, in particular also without an interruption in traction force.

It is particularly advantageous here if the powershift clutch is in the form of a wet-running multiplate clutch.

Such wet-running multiplate clutches are firstly of compact construction and secondly can also be configured for transmitting high levels of drive power.

Overall, it is also preferable if the powershift clutch and the first and second clutches are arranged coaxially with respect to a connecting shaft by means of which the second electric machine and the internal combustion engine are coupled to one another.

Said embodiment permits a compact connection of the connecting shaft to the second transmission arrangement.

In a further preferred embodiment, it is provided that the second electric machine is connected rotationally conjointly to an output shaft of the internal combustion engine.

The connection may be realized for example by means of a connecting shaft. Here, the connection may if appropriate be realized via a vibration damper which allows the output shaft of the internal combustion engine and the second electric machine to rotate relative to one another to a limited extent and which is designed to dampen rotary vibrations generated by the internal combustion engine.

If at least one of the two clutches for the two gear stages is configured as a powershift clutch, the connecting shaft may in this case be in the form of a solid shaft. In particular, it is not necessary here for the output shaft of the internal combustion engine and the output shaft of the second electric machine to be connected to one another by means of a separate separating clutch. Further installation space can be saved in this way.

Furthermore, in a further, altogether preferable embodiment, it is provided that the second transmission arrangement has a first loose gear, which is assigned to the first gear stage, and a second loose gear, which is assigned to the second gear stage, wherein the first and the second loose gear are arranged coaxially with respect to a connecting shaft by means of which the second electric machine and the internal combustion engine are coupled to one another. In particular if the first and the second clutch for the two gear stages are also arranged coaxially with respect to the connecting shaft, drive power can possibly be transmitted in a simple manner from the connecting shaft to the differential via one of the two gear stages of the second transmission arrangement.

Here, it is particularly preferable for the first and the second loose gear to be rotatably mounted directly on the connecting shaft.

In this way, further installation space can be saved in the radial direction too. Cumbersome hollow-shaft constructions, which would have to be provided in the case of a separating clutch being provided in the region of the connecting shaft, can be omitted in this way.

It is also generally preferable if the clutch arrangement has a first and a second clutch, said clutches being arranged coaxially with respect to the connecting shaft, wherein the first and the second loose gear are arranged in an axial direction between the first and the second clutch.

In this way, an actuator arrangement for the actuation of the first and second clutches can be integrated in a relatively simple manner into the second transmission arrangement.

It is however alternatively also possible for the first and the second clutch to be arranged between the first and the second loose gear.

A further preferred embodiment provides that the first loose gear meshes with a first fixed gear, wherein the second loose gear meshes with a second fixed gear, wherein the first and the second fixed gear are fixed to an intermediate shaft, and wherein the intermediate shaft has fixed thereto a drive gearwheel which meshes with an input element (for example a gearwheel) of the differential.

In this way, drive power can be transmitted to the differential alternately via the first or the second gear stage. Furthermore, it is made possible for suitable transmission ratios to be set for the first and the second gear stage.

It is particularly preferable here if the second drive gearwheel is, in an axial direction, arranged on one side of the first and of the second fixed gear.

Said embodiment is preferable in particular when the two fixed gears of the first and of the second gear stage are arranged directly adjacent to one another in an axial direction.

In an embodiment in which the two clutches are arranged between the loose gears, the drive gearwheel may also be arranged between the first and the second fixed gear.

Overall, it is also preferable if the transmission ratios of the first and of the second gear stage are selected such that driving of the vehicle by means of the internal combustion engine within intended parameters is only possible at vehicle speeds greater than 30 km/h.

Here, "driving within intended parameters" is to be understood here to mean that the clutch that is respectively transmitting power is completely or almost completely closed, that is to say is substantially not slipping (microslip).

In this way, it is provided that driving under internal combustion engine power is generally possible only at relatively high vehicle speeds. Two gear stages are adequate for this.

It is particularly preferable for the speed threshold to be higher than 50 km/h, in particular higher than 80 km/h.

During shifting of the gear stages, the internal combustion engine can be accelerated or decelerated to a target rotational speed level with assistance from the generator. In this way, the shift work in the respective clutch can be reduced. Furthermore, during a shift, the vehicle can also continue to be driven by the first electric machine, such that an interruption in traction force can likewise be avoided.

Since the clutches are preferably in the form of powershift-capable multiplate clutches, said clutches can also be operated with microslip in critical rotational speed ranges. By means of this measure, it is possible for the weight and the mass moment of inertia of a torsional or vibration damper in the region of a connecting shaft between the internal combustion engine and the second electric machine to be reduced, without acoustic disadvantages being encountered.

Overall, the drivetrain can be constructed with a small number of components. Furthermore, the drivetrain can be realized with a low weight, within a small installation space, and at low cost.

It is self-evident that the features mentioned above and the features yet to be explained below can be used not only in the respectively specified combination but also in other combinations or individually without departing from the scope of the present invention.

BRIEF DESCRIPTION OF THE DRAWINGS

Exemplary embodiments of the invention are illustrated in the drawings and will be explained in more detail in the following description. In the drawings:

FIG. 1 is a schematic illustration of a motor vehicle having a first embodiment of a drivetrain;

FIG. 2 is a schematic illustration of a part of a further embodiment of a drivetrain.

DESCRIPTION OF PREFERRED EMBODIMENTS

Figure 3:
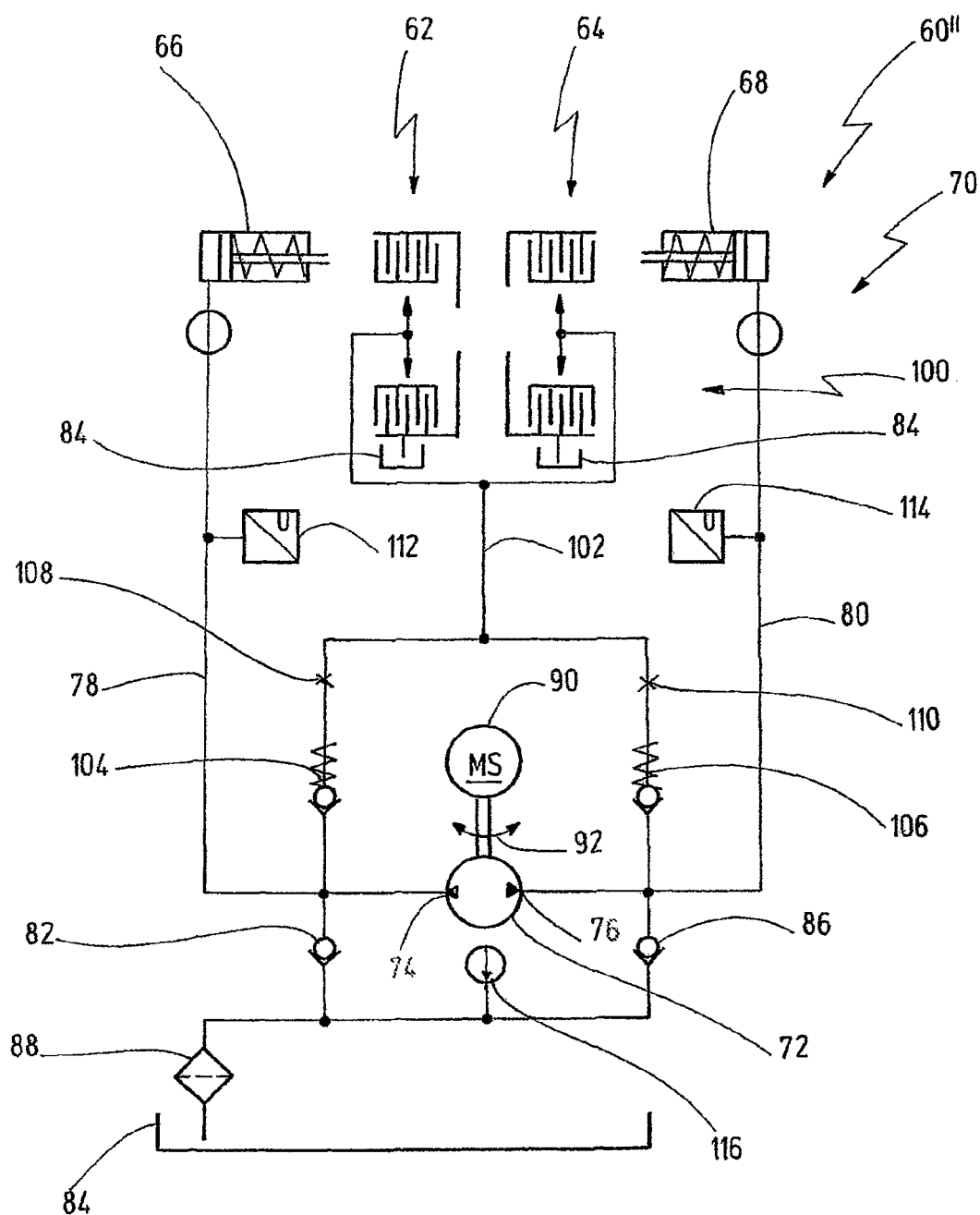
FIG. 3 shows a clutch arrangement according to the invention for a drivetrain.

FIG. 1 schematically illustrates a drivetrain of a motor vehicle 11, said drivetrain being indicated by 10.

The drivetrain 10 has a first electric machine 12 which is designed to provide drive power for the motor vehicle 11. Furthermore, the drivetrain 10 has a differential 16 which is designed to distribute drive power to two driven wheels 18L, 18R (or to two axles) of the motor vehicle 11. Drive power from the first electric machine 12 is transmitted to the differential 16 via a first transmission arrangement 14.

Furthermore, the drivetrain 10 comprises an internal combustion engine 20. Drive power generated by the internal combustion engine 20 can be transmitted to the differential 16 via a second transmission arrangement 22. The drivetrain 10 also comprises a second electric machine 24, which is operated in particular as a generator and which is connected rotationally conjointly to an outer shaft (crankshaft) of the internal combustion engine 20 via a connecting shaft 26. Here, a vibration or torsional damper 28 may be provided on the connecting shaft 26 in order to dampen rotational vibrations of the internal combustion engine 20.

The first electric machine 12 and the second electric machine 24 are connected to a power control unit 30, which in turn is connected to an electrical energy store 32 (vehicle battery).

The drivetrain 10 is configured as a range extender drivetrain. The vehicle can for example be driven purely electromotively by means of the first electric machine 12. If the level of charge of the electrical energy store 32 falls below a certain threshold level, the internal combustion engine 20 can be started in order thereby to drive the second electric machine 24 as a generator, by means of which the electrical energy store 32 is recharged.

Furthermore, driving purely under internal combustion engine power is possible by means of the second transmission arrangement 22, but preferably only in speed ranges above 30 km/h, preferably above 50 km/h and particularly preferably above 80 km/h.

The first transmission arrangement 14 has a first drive shaft 34 which is coupled to an output shaft of the first electric machine 12. Fixed to the first drive shaft is a gearwheel 36 which meshes with a first drive gearwheel (first drive pinion) 38. The first drive gearwheel 38 is fixed to a first intermediate shaft 39 which is oriented parallel to the first drive shaft 34. The first drive gearwheel 38 meshes with an input element (for example a gearwheel) of the differential 16.

The first drive shaft 34 and the first intermediate shaft 39 are oriented transversely with respect to a longitudinal axis of the motor vehicle 11, in particular approximately parallel to the driven axle of the wheels 18L, 18R.

The second transmission arrangement 22 has a first gear stage G1 and a second gear stage G2. The internal combustion engine 20 can consequently be connected to the differential 16 via the different transmission ratios of the first and of the second gear stage G1, G2.

The first gear stage G1 comprises a first loose gear 42 which is rotatably mounted on the connecting shaft 26. The first loose gear 42 meshes with a first fixed gear 44 which is fixed to a second intermediate shaft 46. To the second intermediate shaft 46 there is also fixed a second drive gearwheel 48 (second drive pinion) which meshes with the input element 40 of the differential 16.

The second gear stage G2 has a second loose gear 50, which is rotatably mounted on the connecting shaft 26, and a second fixed gear 52, which is rotationally conjointly connected to the second intermediate shaft 46.

The second drive gearwheel 48 is arranged between the first fixed gear 44 and the second fixed gear 52 in an axial direction of the second intermediate shaft 46.

The second intermediate shaft 46 and the connecting shaft 26 are likewise oriented transversely with respect to a longitudinal axis of the motor vehicle 11, in particular parallel to the first drive shaft 34 and to the first intermediate shaft 39.

The drivetrain 10 also has a housing 54 which has a first housing wall 56, which extends substantially parallel to the longitudinal axis of the motor vehicle 11, and a second housing wall 58, which extends substantially parallel to the longitudinal axis of the motor vehicle. The first drive shaft 34, the first intermediate shaft 39 and the second intermediate shaft 46, and if appropriate the connecting shaft 26, are mounted rotatably relative to the housing 54, preferably by means of respective radial bearings on the first housing wall 56 and on the second housing wall 58.

For the shifting of the two gear stages G1, G2, a clutch arrangement 60 is provided. The clutch arrangement 60 has a first clutch 62 and a second clutch 64. The first and the second clutch 62, 64 are arranged between the first loose gear 42 and the second loose gear 50 in an axial direction of the connecting shaft 26. The first and the second clutch 62, 64 are in each case in the form of powershift clutches, in particular in the form of wet-running multiplate clutches. The first clutch 62 and the second clutch 64 have a common input element which is rotationally conjointly connected to the connecting shaft 26. An output element of the first clutch 62 is connected to the first loose gear 42. An output element of the second clutch 64 is connected to the second loose gear 50.

The first and the second clutch 62, 64 can, with a suitable actuator arrangement, be actuated in overlapping fashion during a gear change in order to avoid interruptions in traction force. The two clutches 62, 64 are however preferably actuated by means of an actuator arrangement which permits a changeover from one gear stage to another gear stage only with an interruption in traction force, as will be described below. Such an actuator arrangement is preferably in the form of a hydraulic actuator arrangement, especially since, in the case of wet-running multiplate clutches, it is generally also necessary for these to be lubricated and cooled by means of a fluid.

The transmission ratios realized by means of the first and the second gear stage G1, G2 make it possible, during operation within intended parameters, for the motor vehicle 11 to be driven at speeds above the abovementioned speed thresholds (for example greater than 30 km/h). Since at least one of the two clutches 62, 64 is in the form of a powershift clutch, however, starting by means of the internal combustion engine 20 is also possible in an emergency operating situation.

FIG. 2 shows a part of an alternative embodiment of a drivetrain 10'. The drivetrain 10' generally corresponds, with regard to construction and mode of operation, to the drivetrain 10 of FIG. 1. Identical elements are thus denoted by the same reference numerals. Substantially the differences will be explained below.

In the case of the drivetrain 10', the first and the second loose gear 42, 50 are arranged adjacent to one another. The clutch arrangement 60' has a first clutch 62 for the first gear stage G1, said first clutch being arranged between the first loose gear 42 and the internal combustion engine 20 as viewed in an axial direction. The second clutch 64 is arranged between the second loose gear 50 and the second electric machine 24 as viewed in an axial direction.

The first clutch 62 is actuated by means of a schematically indicated first hydraulic cylinder 66, and the second clutch 64 is actuated by means of a schematically indicated second hydraulic cylinder 68. The actuating directions of the hydraulic cylinders 66, 68 point toward one another.

The second drive gearwheel 48 is arranged adjacent to the two fixed gears 44, 52 as viewed in an axial direction and meshes with the input element 40 of the differential 16. The construction of the drivetrain 10' corresponds to that of the drivetrain 10 of FIG. 1 as regards the first electric machine 12 and the first transmission arrangement 14.

In the drivetrain 10', the first and the second clutch 62, 64 each have a dedicated input element which is connected rotationally conjointly to the connecting shaft 26. Owing to the hydraulic cylinders 66, 68 that act in an axially outward direction, however, the installation space required for this purpose can be more easily integrated into the existing overall installation space.

FIG. 3 shows, in schematic form, an embodiment of a clutch arrangement 60" which can be used in the drivetrains 10, 10' of FIGS. 1 and 2.

The clutch arrangement 60" of FIG. 3 has an actuator arrangement 70 with a single actuator pump 72. The actuator pump 72 has a first port 74 and a second port 76. The first port 74 is connected via a first connecting line 78 directly to a first hydraulic cylinder 66 for the actuation of the first clutch 62. The second port 76 is connected via a second connecting line 80 directly to a second hydraulic cylinder 68 for the actuation of the second clutch 64.

The first port 74 is furthermore connected via a first check valve 82 (first snifting valve) to a tank 84. The second port 76 is connected via a second check valve 86 (second snifting valve) to the tank 84. The connection may in this case include a fluid filter 88 which is arranged between the check valves 82, 86 and the tank 84.

The actuator pump 72 is driven by means of an electric motor 90, which is in the form of a dedicated actuator motor and which can be operated independently of the first and the second electric machine 12, 24.

The electric motor 90 is designed to drive the actuator pump 72 in two directions of rotation, as shown in FIG. 3 at 92.

In the first direction of rotation, the first port 74 is a pressure port and the second port 76 is a suction port which draws fluid out of the tank 84 via the second check valve 86. In the second direction of rotation, the first port 74 is a suction port which draws fluid out of the tank 84 via the first check valve 82, and the second port 76 is a pressure port. In the first direction of rotation, the first check valve 82 prevents fluid from flowing back into the tank 84. In the second direction of rotation, the second check valve 86 prevents fluid from flowing back into the tank 84.

The actuator arrangement 70 is in the form of a type of bidirectional pump actuator. The control of the travel and/or of the pressure of the two hydraulic cylinders 66, 68 may in this case be regulated and/or controlled by means of the rotational speed of the electric motor 90 and thus by means of the volume flow provided in each case by the actuator pump 72. To improve controllability and/or regulability, provision may be made for the first and/or the second connecting line 78, 80 to be connected to the tank 84 via an aperture.

In the present case, the actuator arrangement 70 however also serves to supply a lubricating fluid to the first and the second clutch 62, 64. For this purpose, the actuator arrangement 70 has a lubrication circuit 100 which comprises a lubricating fluid line 102. The lubricating fluid line 102 is connected via suitable lines to the first and the second clutch 62, 64, in particular to radially inner sections of the two clutches 62, 64 in order to supply these with lubricating fluid radially from the inside. The lubricating fluid is subsequently supplied back to the tank, as is schematically shown at 84, below the two clutches 62, 64.

The lubricating fluid line 102 is connected to the first port 74 via a third check valve 104. Furthermore, the lubricating fluid line 102 is connected via a fourth check valve 106 to the second port 76 of the actuator pump 72. The third and the fourth check valve 104, 106 may preferably be spring-loaded check valves, as schematically indicated in FIG. 3.

Furthermore, a first aperture 108 is provided between the third check valve 104 and the lubricating fluid line 102. A second aperture 110 is provided between the fourth check valve 106 and the lubricating fluid line 102.

In the first direction of rotation, in which the first port 74 is a pressure port, fluid is consequently supplied to the lubricating fluid line 102 via the third check valve 104 and the first aperture 108. Here, the first aperture 108 serves as a leakage aperture and improves the controllability and regulability of the pressure in the first connecting line 78. In the first direction of rotation, fluid is drawn in via the second port 76, such that the fourth check valve 106 is closed.

In the second direction of rotation, the second port 76 is a pressure port, such that fluid is supplied to the lubricating fluid line 102 via the fourth check valve 106 and the second aperture 110. Here, too, the second aperture 110 serves to improve the regulability. In the second direction of rotation, the first port 74 is a suction port, such that the third check valve 104 is closed.

Provision is optionally made for a first pressure sensor 112 to be provided on the first connecting line 78 in order to measure, and if appropriate be able to regulate, the fluid pressure in the first connecting line 78. A second pressure sensor 114 may correspondingly also be provided on the second connecting line 80.

Finally, a temperature sensor 116 may be provided in the region of a line which connects the check valves 82, 86 to the tank 84, which temperature sensor likewise preferably serves for the adaptation of control or regulation characteristic curves of a control device (not illustrated in any more detail) as a function of the temperature of the fluid.

The first and the second clutch 62, 64 are preferably designed as "normally open" clutches. The first and the second hydraulic cylinder 66, 68 may in this case be in the form of single-acting hydraulic cylinders which are optionally equipped with a mechanical restoring spring, as shown in FIG. 3.

Since, in this embodiment of the actuator arrangement 70, only either the first or the second hydraulic cylinder 66, 68 is supplied with pressure, it is not possible in this embodiment for gear changes to be performed under load. This is however generally not required in the case of this type of drivetrain.

By means of the illustrated actuator arrangement 70, it is possible for the hydraulic system to be ventilated during the filling of the first or of the second connecting line 78, 80. Furthermore, air is prevented from being pumped into the hydraulic system by means of the actuator pump 72. The apertures provided for improving regulability are in this case not directly connected to the connecting lines 78, 80 but rather are integrated into the lubrication circuit 100. The intentional leakage through the leakage aperture is consequently not supplied directly to the tank 84, but rather is supplied to the two clutches 62, 64 for lubrication purposes. In this way, an additional lubricating fluid pump can be omitted. The check valves 104, 106 make it possible for lubricating oil to be supplied to the clutches 62, 64 regardless of the direction of rotation of the actuator pump 72, without the risk of air being drawn in by the actuator pump 72. To ensure the functioning thereof, the third and the fourth check valve 104, 106 are in each case preferably equipped with a preload spring, as mentioned above.

The actuator arrangement 70 can be realized with few components. Here, the gear stages G1, G2 can be shifted without the need for mechanical shift components such as for example shift drums, shift rods or the like. The actuator pump 72 with the electric motor 90 coupled thereto can be arranged within the drivetrain 10 at a location which is expedient from an installation space aspect. Overall, considerable installation space and weight advantages are attained in relation to a conventional shift actuator arrangement.

Instead of a single lubricating fluid line 102, it is also possible for two lubricating fluid lines to be provided, one of which connects the first aperture 108 to the first clutch 62, and the second line of which connects the second aperture 110 to the second clutch 64. In this way, it is if appropriate possible for the relatively small volume flow to be better utilized, because in this case the clutch that is presently being actuated is supplied with lubricating oil.

The invention claimed is:

1. A clutch arrangement for a drivetrain of a motor vehicle, having:
    a first clutch in the form of a wet-running clutch;
    a second clutch in the form of a wet-running clutch; and
    a hydraulic actuator arrangement;
        wherein the actuator arrangement has a first hydraulic cylinder for actuating the first clutch and a second hydraulic cylinder for actuating the second clutch;
        wherein the actuator arrangement has an actuator pump which is driven by means of an electric motor and which can be operated in two directions of rotation;
        wherein the actuator pump has a first port, which is connected to the first hydraulic cylinder, and a second port, which is connected to the second hydraulic cylinder;

wherein the actuator arrangement actuates the first or the second clutch depending on the direction of rotation of the actuator pump; and wherein the actuator arrangement is designed to supply lubricating fluid to the clutches.

2. The clutch arrangement according to claim 1, wherein the first port is connected via a first connecting line directly to the first hydraulic cylinder.

3. The clutch arrangement according to claim 2, wherein the first connecting line is connected via a first aperture to a tank.

4. The clutch arrangement according to claim 1, wherein the second port is connected via a second connecting line directly to the second hydraulic cylinder.

5. The clutch arrangement according to claim 4, wherein the second connecting line is connected via a second aperture to a tank.

6. The clutch arrangement according to claim 1, wherein at least one of the first port being connected via a first check valve to a tank and the second port being connected via a second check valve to the tank.

7. The clutch arrangement according to claim 1, wherein at least one of the first port and the second port is connected to a lubricating fluid line via which lubricating fluid is supplied to the clutches.

8. The clutch arrangement according to claim 7, wherein at least one of the first port being connected via a third check valve to the lubricating fluid line and the second port being connected via a fourth check valve to the lubricating fluid line.

9. The clutch arrangement according to claim 7, wherein at least one of a first aperture being arranged in the connection between the first port and the lubricating fluid line and a second aperture being arranged in the connection between the second port and the lubricating fluid line.

10. A drivetrain for a motor vehicle, having:
a first electric machine for providing drive power, wherein the first electric machine is connected to an electrical energy store;
a differential which can distribute drive power to two driven wheels or axles of the motor vehicle;
a first transmission arrangement which connects the first electric machine to the differential;
an internal combustion engine;
a second electric machine which is coupled to the internal combustion engine in order to charge the electrical energy store in a generator mode;
a second transmission arrangement which connects the internal combustion engine to the differential;
wherein the second transmission arrangement has a first gear stage and a second gear stage which can be alternately engaged, for the transmission of drive power from the internal combustion engine to the differential, by means of a clutch arrangement, the clutch arrangement having:
a first clutch;
a second clutch;
a hydraulic actuator arrangement;
wherein the actuator arrangement has a first hydraulic cylinder for actuating the first clutch and a second hydraulic cylinder for actuating the second clutch;
wherein the actuator arrangement has an actuator pump which is driven by means of an electric motor and which can be operated in two directions of rotation;
wherein the actuator pump has a first port, which is connected to the first hydraulic cylinder, and a second port, which is connected to the second hydraulic cylinder; and
wherein the actuator arrangement actuates the first or the second clutch depending on the direction of rotation of the actuator pump.

11. The drivetrain according to claim 10, wherein the clutches are arranged coaxially with respect to a connecting shaft by means of which the second electric machine and the internal combustion engine are coupled to one another.

12. The drivetrain according to claim 10, wherein the second electric machine is connected rotationally conjointly to an output shaft of the internal combustion engine.

13. The drivetrain according to claim 10, wherein the second transmission arrangement has a first loose gear, which is assigned to the first gear stage, and a second loose gear, which is assigned to the second gear stage, wherein the first and the second loose gear are arranged coaxially with respect to a connecting shaft by means of which the second electric machine and the internal combustion engine are coupled to one another.

14. The drivetrain according to claim 13, wherein the first and the second loose gear are rotatably mounted directly on the connecting shaft.

15. The drivetrain according to claim 13, wherein the clutch arrangement has a first and a second powershift-capable clutch, said clutches being arranged coaxially with respect to the connecting shaft, and wherein the first and the second loose gear are arranged in an axial direction between the first and the second powershift-capable clutch.

16. The drivetrain according to claim 10, wherein the transmission ratios of the first and the second gear stage are selected such that driving of the vehicle by means of the internal combustion engine within intended parameters is only possible at vehicle speeds greater than 30 km/h.

* * * * *